United States Patent

Wegner

[11] 3,755,080
[45] Aug. 28, 1973

[54] MICROBIAL CONVERSION OF NAPHTHALENE BASE HYDROCARBONS

[75] Inventor: Eugene H. Wegner, Bartlesville, Okla.

[73] Assignee: Phillips Petroleum Company, Bartlesville, Okla.

[22] Filed: Aug. 24, 1970

[21] Appl. No.: 66,629

Related U.S. Application Data

[63] Continuation of Ser. No. 697,598, Jan. 18, 1968, abandoned.

[52] U.S. Cl. .............................. 195/28 R, 195/51 R
[51] Int. Cl. ............................................. C12d 1/00
[58] Field of Search ............................... 195/51, 28

[56] References Cited
UNITED STATES PATENTS

| | | | |
|---|---|---|---|
| 3,057,784 | 10/1962 | Davis et al. | 195/28 |
| 3,224,946 | 12/1965 | Raymond | 195/28 |
| 3,458,399 | 7/1969 | Hosler | 195/28 |

OTHER PUBLICATIONS

Treccani, J. Gen. Microbial, Vol. 11, Pages 341–348 (1954).

Primary Examiner—Alvin E. Tanenholtz
Attorney—Young and Quigg

[57] ABSTRACT

Naphthalene base hydrocarbons of the general formula

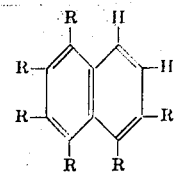

are converted to compounds of the general formulas

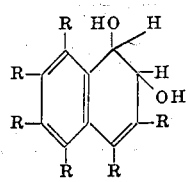 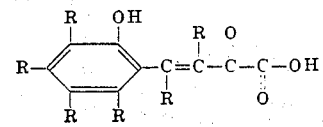

wherein each R is selected from hydrogen, methyl and ethyl radicals, by contacting said hydrocarbon with an aqueous metal salts medium containing Nocardia species bacteria ssigned the numerical designation NRRL 3385 in the presence of an oxygen source.

6 Claims, No Drawings

MICROBIAL CONVERSION OF NAPHTHALENE BASE HYDROCARBONS

This application is a continuation of United States application Ser. No. 697,598, filed Jan. 15, 1968 now abandoned.

BACKGROUND OF THE INVENTION

Numerous investigators have studied the interaction of several species of enzymatically active microorganisms. The approaches taken and results achieved by some of these investigators are summarized by J. I. Davies and W. C. Evans in their article, "Oxidative Metabolism of Naphthalene by Soil Pseudomonads," Biochem. J. (1964), 91, 251. Certain of the microorganisms which have been studied are known to convert naphthalene to D-trans-1,2-dihydro-1,2-dihydroxynaphthalene and cis-o-hydroxybenzalpyruvic acid. However, in each instance, these products are shown to be intermediates conversion products which are further oxidized and converted to other forms by the microorganisms employed. As a result, the species of microorganisms employed to convert naphthalene to these products consumed the products themselves and did not allow the accumulation of significant quantities of these "intermediates." These materials are known to be commercially attractive at least in part by reason of their utility as precursors of 1-naphthol or coumarin. It is, therefore, desirable to produce a process which allows the recovery of these materials in significant quantities.

It is, therefore, one object of this invention to provide a method for converting substituted and unsubstituted naphthalenes. It is another object of this invention to provide a method for the oxidative fermentation of substituted and unsubstituted dinuclear aromatics. It is yet another object of this invention to provide an oxidative fermentation process for the production of substituted and unsubstituted 1,2-dihydro-1,2-dihydroxynaphthalenes and substituted pyruvic acids in high yields. It is another object of this invention to provide a method for the production of these products in the absence of substantial amounts of secondary reaction products.

SUMMARY OF THE INVENTION

In accordance with one embodiment of this invention, dinuclear aromatic hydrocarbons having hydrogen atoms on at least one pair of adjacent alpha and beta nuclear carbon atoms are oxidized by Nocardia species bacteria assigned the numerical designation NRRL 3385 in a nutrient mineral salts medium and in the presence of oxygen at a pH and temperature sufficient to promote the conversion of said hydrocarbons to oxidized derivatives thereof. This method is particularly useful for the production of substituted and unsubstituted 1,2-dihydro-1,2-dihydroxynaphthalenes and substituted pyruvic acids which are convertible in the presence of inorganic acids to 1-naphthol or alkyl derivatives thereof, and coumarin or alkyl derivatives thereof, respectively.

Examples of some naphthalene compounds which can be used in the process of this invention include naphthalene, 1-methylnaphthalene, 2-methylnaphthalene, 1-ethylnaphthalene, 2-ethylnaphthalene, 1,2-dimethylnaphthalene, 1,4-dimethylnaphthalene, 1,5-dimethyl-2-ethylnaphthalene, 1,-2,3,4-tetramethylnaphthalene, 1,2,3-trimethyl-4,6-diethylnaphthalene, 1,2,3,4,5,6-hexaethylnaphthalene, and the like, and mixtures thereof.

Examples of some 1,2-dihydro-1,2-dihydroxynaphthalene compounds which can be produced by the process of this invention include 1,2-dihydro-1,2-dihydroxynaphthalene, 1,2-dihydro-1,2-dihydroxy-3-methylnaphthalene, 1,2-dihydro-1,2-dihydroxy-5-methylnaphthalene, 1,2-dihydro-1,2-dihydroxy-7-methylnaphthalene, 1,2-dihydro-1,2-dihydroxy-6-ethylnaphthalene, 1,2-dihydro-1,2-dihydroxy-8-ethylnaphthalene, 1,2-dihydro-1,2-dihydroxy-4,7-dimethylnaphthalene, 1,2-dihydro-1,2-dihydroxy-5,8-dimethylnaphthalene, 1,2-dihydro-1,2-dihydroxy-5,6-dimethyl-8-ethylnaphthalene, 1,2-dihydro-1,2-dihydroxy-3,7-dimethyl-4,8-diethylnaphthalene, 1,2-dihydro-1,2-dihydroxy-3,4,5,6,7,8-hexaethylnaphthalene, and the like, and mixtures thereof.

Examples of some substituted pyruvic acids which can be produced by the process of this invention include 2-oxo-4-(2-hydroxyphenyl)-3-butenoic acid (o-hydroxybenzalpyruvic acid), 2-oxo-3-methyl-4-(2-hydroxyphenyl)-3-butenoic acid, 2-oxo-4-(2-hydroxyphenyl)-3-pentenoic acid, 2-oxo-4-(2-hydroxy-p-tolyl)-3-butenoic acid, 2-oxo-4-(2-hydroxy-3,6-dimethylphenyl)-3-butenoic acid, 2-oxo-4-(2-hydroxy-3,5-dimethyl-4-ethylphenyl)-3-butenoic acid, 2-oxo-4-(2-hydroxy-3,4,5-triethylphenyl)-3-pentenoic acid, 2-oxo-3-ethyl-4-(2-hydroxy-3,4,5,6-tetraethylphenyl)-3-hexenoic acid, and the like, and mixtures thereof.

The dinuclear aromatic compounds which are converted by this method have the general formula

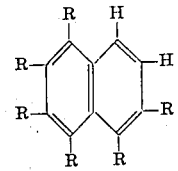

The substituted pyruvic acids and 1,2-dihydro-1,2-dihydroxynaphthalenes produced by these conversions have the same general formulas

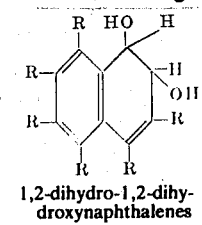 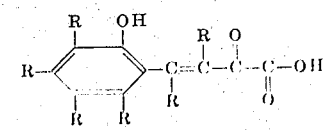

1,2-dihydro-1,2-dihydroxynaphthalenes     substituted pyruvic acids wherein each R is selected from hydrogen, methyl and ethyl. It is presently preferred that naphthalene be employed as the starting material due to the great utility which the resulting products have as precursors.

The specific Nocardia species of bacteria which is capable of accomplishing the conversions of this method has been deposited with the Culture Collection Unit of the Northern Utilization Research and Development Division, United States Department of Agriculture, Peoria, Illinois, where it has been assigned the numerical designation NRRL 3385.

This species has been obtained from Guatemalan soil. On plate count agar, the cells are gram-positive, long rods and show branching and budding in 2-hour cultures. In older cultures, e.g., 4 to 6-day cultures, the cells fragment and form short rods or coccoid forms. The colonies are buff or tan, tending to become slightly pink on older cultures. The colonies are rough in texture, and aerial growth is not present. On mineral media-naphthalene plates, the growth is cream-colored, changing to yellow, then to dark brown, as the culture ages. In addition to the naphthalenes, the culture can utilize substrates such as paraffins, acetate, glucose, and benzoic acid for growth. If desired, any substrate which can be utilized by the culture can be present during the fermentation of the naphthalenes to provide an additional carbon source for growth of the microorganisms.

The aqueous mineral salts medium used in the fermentation process can be any of those known in the fermentation art which supply the following elements:

Nitrogen (e.g., as $NH_4^+$ or $NO_3^-$)
Phosphorus (e.g., as $PO_4^{-3}$)
Potassium (as $K^+$)
Calcium (as $Ca^{+2}$)
Sulfur (e.g., as $SO_4^{-2}$)
Iron (as $Fe^{+3}$ or $Fe^{+2}$)
Magnesium (as $Mg^{+2}$)

The pH of the aqueous mineral salts medium should be within the range of about 5–8.

Although the concentration of the naphthalene compound in the aqueous mineral salts medium can vary over a wide range, the aqueous medium will generally contain about 1–100 g., preferably about 5–50 g., of the naphthalene compound per liter of medium.

The concentration of the Nocardia species of bacteria can vary over a broad range but generally will be within the range of about 0.01–4 weight per cent based on the aqueous mineral salts medium.

Air or other oxygen-containing gas must be present during the fermentation process. The amount of molecular oxygen employed should be sufficient to provide at least one mole of oxygen for each mole of naphthalene compound converted.

Although the period of fermentation can vary over a wide range, the fermentation process of this invention is generally carried out for a period within the range of about 1 hour to 3 weeks, preferably within the range of about 12 hours to 10 days. The temperature at which the fermentation is conducted can vary considerably, but generally will be within the range of about 10–45° C., preferably within the range of about 20–35° C. Although the fermentation preferably is carried out at approximately atmospheric pressure, lower or higher pressure, e.g., about 0.1–10 atmospheres, can be employed.

The products of this invention can be separated from the fermentation mixture by conventional procedures, e.g., by removing the microorganisms by filtration or centrifugation and separating the desired products from the resulting aqueous solution by extraction, crystallization, adsorption, and the like. Several methods for separating the products and culture, purifying the products, and maintaining and reusing the microorganisms are disclosed in copending applications Ser. No. 549,472, filed May 12, 1966, now U.S. Pat. No. 3,510,401, issued May 5, 1970.

The 1,2-dihydro-1,2-dihydroxynaphthalenes produced by the process of this invention are readily converted to 1-naphthol or alkyl derivatives thereof by heating with a mineral acid. The substituted pyruvic acids produced by the process of this invention can be converted to coumarin or alkyl derivatives thereof by treatment with a dehydrating agent such as sulfuric acid.

EXAMPLE I

Nocardia culture NRRL 3385, of Guatemalan soil origin, was employed to inoculate 250 ml. of an aqueous medium having the following composition:

|  | g./liter |
|---|---|
| $KH_2PO_4$ | 2.0 |
| $K_2HPO_4$ | 2.0 |
| $MgSO_4.7H_2O$ | 1.2 |
| $CaCl_{2.2}H_2$) | 0.04 |
| $NH_4NO_3$ | 2.0 |
| $FeCl_3.6H_2O$ | 0.01 |
| Naphthalene | 10.0 |
| Water | Remainder |

The inoculated mixture was incubated at about 25° C. on a rotary shaker for 6 days. A sample of the mixture, after filtration and dilution with water, was then analyzed by ultraviolet spectrometry. Based on measurement of the absorption band exhibited by the solution at 262 millimicrons, the concentration of D-trans-1,2-dihydro-1,2-dihydroxynaphthalene in the undiluted fermentation filtrate was 1.87 g./liter. A sample of the diluted filtrate, after treatment with aqueous sodium hydroxide to give a solution 0.1 N with respect to sodium hydroxide, was analyzed by ultraviolet spectrometry. Based on measurement of the absorption band exhibited by this solution at 418–420 millimicrons, using a sample cell 1 cm. in thickness, the concentration of o-hydroxybenzalpyruvic acid in the undiluted fermentation filtrate was 40 optical density units.

In other experiments carried out similarly, D-trans-1,2-dihydro-1,2-dihydroxynaphthalene was isolated by making slightly alkaline the filtrate from the fermentation mixture, followed by extraction of the alkaline solution with ether, removal of solvent from the ether extract, and recrystallization of the product from hexane-chloroform or benzene. Alternatively, the D-trans-1,2-dihydro-1,2-dihydroxynaphthalene was isolated from the culture filtrate by adsorption on decolorizing carbon, followed by elution with acetone and re-crystallization from benzene. The product had a melting point of 124–128.5° C. Elemental analysis showed the product to contain 75.7 weight per cent carbon and 6.0 weight per cent hydrogen, in agreement with the empirical formula $C_{10}H_{10}O_2$. An ultraviolet spectrum of the compound dissolved in water showed the wave length of maximum absorption to the 262 millimicrons. The optical rotation and the nuclear magnetic resonance, mass, and infrared spectra were consistent with those to be expected for a compound of the assigned structure.

The o-hydroxybenzalpyruvic acid was identified on the basis of its characteristic ultraviolet spectrum, the compound in aqueous 0.1 N sodium hydroxide exhibiting maximum absorption at 298 millimicrons and at 419 millimicrons.

EXAMPLE II

Nocardia culture NRRL 3385, of Guatemalan soil origin, was used to inoculate 250 ml. of an aqueous medium having the following composition:

|  | g./liter |
|---|---|
| $K_HPO_4$ | 0.1 |
| $KH_2PO_4$ | 0.1 |
| $NaCl$ | 2.0 |
| $MgSO_4.7H_2O$ | 1.2 |
| $NH_4NO_3$ | 0.2 |
| $CaCo_3$ | 4.0 |
| $FeCl_3.6H_2O$ | 0.01 |
| Naphthalene | 10.0 |
| Water | Remainder |

The inoculated mixture was incubated at about 25° C. on a rotary shaker for 7 days. Ultraviolet spectrometry by the procedure given in Example I showed the concentration of D-trans-1,2-dihydro-1,2-dihydroxynaphthalene and o-hydroxybenzalpyruvic acid in the fermentation filtrate to be 2.47 g./liter and 33 optical density units, respectively.

I claim:

1. A method for oxidizing dinuclear aromatic hyrocarbons having hydrogen atoms on at least one pair of adjacnet alpha and beta nuclear carbon atoms, which method comprises contacting said dinuclear aromatic hydrocarbon with Nocardia species bacteria assigned the numerical designation NRRL 3385 in a nutrient mineral salts medium in the presence of oxygen at a pH and temperature sufficient to promote the metabolic activity of said bacteria toward said dinuclear aromatic hydrocarbon for a time sufficient to produce significant recoverable amounts of hydrocarbon conversion product and thereafter isolating said hydrocarbon conversion product.

wherein said dinuclear aromatic hydrocarbon has the structural formula

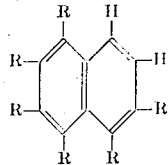

wherein each R is selected from the group consisting of hydrogen, methyl, and ethyl; the reaction phase for said contacting comprises a dispersion of said dinuclear aromatic hydrocarbon and an aqueous mineral salts medium comprising sources of nitrogen, phosphorus, potassium, calcium, sulfur, iron and magnesium; and said hydrocarbon conversion product is (a)

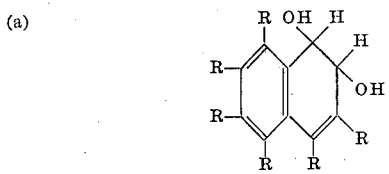

or (b)

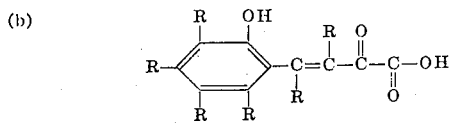

wherein each R is hydrogen, methyl or ethyl.

2. The method of claim 1 wherein said temperature is within the range of about 10 to about 45° C., the amount of oxygen is sufficient to provide at least one mole of oxygen for each mole of said dinuclear aromatic hydrocarbon converted, the concentration of said dinuclear aromatic hydrocarbon is within the range of about 1 to about 100 grams per liter of said aqueous mineral salts medium, the concentration of said Nocardia species NRRL 3385 is within the range of about 0.01 to about 4 weight percent based on said aqueous mineral salts medium, and said recoverable amounts are at least about 1.87 grams per liter of undoluted fermentation filtrate.

3. The method of claim 2 wherein said nitrogen source is at least one of $NH_4^+$ and $NO_3^-$, said phosphorus source comprises phosphate ion, said potassium source comprises potassium ion, said calcium and magnesium sources comprise calcium and magnesium ions, respectively, said source of iron comprises at least one of ferric and ferrous ions, said source of sulfur comprises sulfate ions, and the pH of said medium is within the range of from about 5 to about 8.

4. The method of claim 3 wherein said dinuclear aromatic hydrocarbon is naphthalene.

5. A method of converting hydrocarbons of the general formula

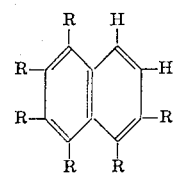

to significant recoverable amounts of compounds of the general formulae:

(a)

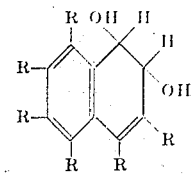

or (b)

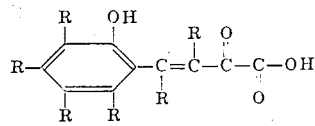

wherein each R is hydrogen, methyl or ethyl, which method comprises contacting said hydrocarbon with an aqueous mineral salts medium containing from about 0.01 to about 4 weight per cent of Nocardia species bacteria assigned the numerical designation NRRL 3385 based on said aqueous mineral salts medium, said medium comprises a nitrogen source comprising at least one of $NH_4^+$ and $NO_3$ ions; potassium, calcium, and magnesium sources comprising $K^+$, $Ca^{+2}$ and $MG^{+2}$, respectively; a sulfur source comprising sulfate ions; an iron source comprising at least one of ferric and ferrous ions; an amount of oxygen sufficient to provide at least one mole of oxygen for each mole of said hydrocarbon converted; and having a pH of about 5 to about 8; at a temperature within the range of from about 10 to 45° C., for a time sufficient to produce said significant recoverable amounts of said compounds, and thereafter isolating said compounds of the above general formulae from the fermentation filtrate.

6. The method according to claim 5 wherein said recoverable amount of hydrocarbon conversion product represented by said formula (a) is at least 1.87 grams per liter of undiluted fermentation filtrate, and said hydrocarbon is naphthalene.

* * * * *

UNITED STATES PATENT OFFICE
CERTIFICATE OF CORRECTION

Patent No. 3,755,080          Dated August 28, 1973

Inventor(s) Eugene H. Wegner

It is certified that error appears in the above-identified patent and that said Letters Patent are hereby corrected as shown below:

Claim 3, column 6, line 12, "from" should be deleted.

Claim 5, column 6, line 27, (in formula) "H" should be R.

line 46, "$NO_3$" should read $NO_3^-$.

Signed and sealed this 13th day of August 1974.

(SEAL)
Attest:

McCOY M. GIBSON, JR.          C. MARSHALL DANN
Attesting Officer              Commissioner of Patents